Nov. 13, 1951 L. J. PURCELL 2,574,757

PHONOGRAPH RECORD STORAGE CABINET

Filed Feb. 13, 1948 2 SHEETS—SHEET 1

LEE J. PURCELL,
INVENTOR

BY Robert W. Fulwider

ATTORNEY.

PHONOGRAPH RECORD STORAGE CABINET

Filed Feb. 13, 1948 2 SHEETS—SHEET 2

LEE J. PURCELL,
INVENTOR

BY Robert W. Fulwider
ATTORNEY.

Patented Nov. 13, 1951

2,574,757

UNITED STATES PATENT OFFICE 2,574,757

PHONOGRAPH RECORD STORAGE CABINET

Lee J. Purcell, Los Angeles, Calif., assignor to Development Corporation of America, Los Angeles, Calif., a corporation of California Application February 13, 1948, Serial No. 8,105

14 Claims. (Cl. 312—17)

This invention relates to filing cabinets for storing disc-type phonograph records, and more particularly to a cabinet adapted to receive a number of such records, and having means to selectively release any one or several of said records for withdrawal from the cabinet.

The present application is a continuation in part of my copending application, Serial No. 696,230, filed September 11, 1946, and entitled Phonograph Record Cabinet, which has now become Patent No. 2,567,966, dated September 18, 1951.

As stated in the aforesaid copending application, it is desirable in the storage of phonograph records of the disc type that they be so arranged that any desired record out of a large group may be selected and withdrawn with the least possible effort.

Furthermore, it is desirable that when stored, the records be prevented from sliding against one another and be protected from dust and other foreign matter. Still further advantages are gained by storing the records on edge, thus to prevent warping or bending, such as may occur if the records are stored in conventional albums and stacked horizontally.

Briefly my invention achieves the foregoing desirable objects by providing a cabinet having formed therein, a plurality of vertical slot-like receptacles in side-by-side relationship into which records may be rolled to rest on their edges therein. A cam-like member is provided in conjunction with each slot and so positioned that when a record is permitted to roll into place, the cam member drops against an upper edge thereof, holding the record in place until it is released by manipulation of a trigger-like member accessible from the front of the cabinet.

A further desirable feature in a record cabinet of the class just described, is that of adjustability to receive records of various conventional sizes.

A major object of the present invention is to provide a phonograph record cabinet of the class described having a plurality of side-by-side slot-like record receptacles and a releasable holding member for each receptacle, which cabinet may be readily adjusted to receive records of any one of a number of sizes.

A further object of the invention is to provide a cabinet of the class described in which all of the records placed therein rest on the same supporting members whereby to reduce the requisite number of separate parts and to thereby reduce the manufacturing costs.

The foregoing and other objects and advantages of my invention will become more apparent from the following detailed description taken in connection with the attached drawings in which.

Figures 1, 2, 3:
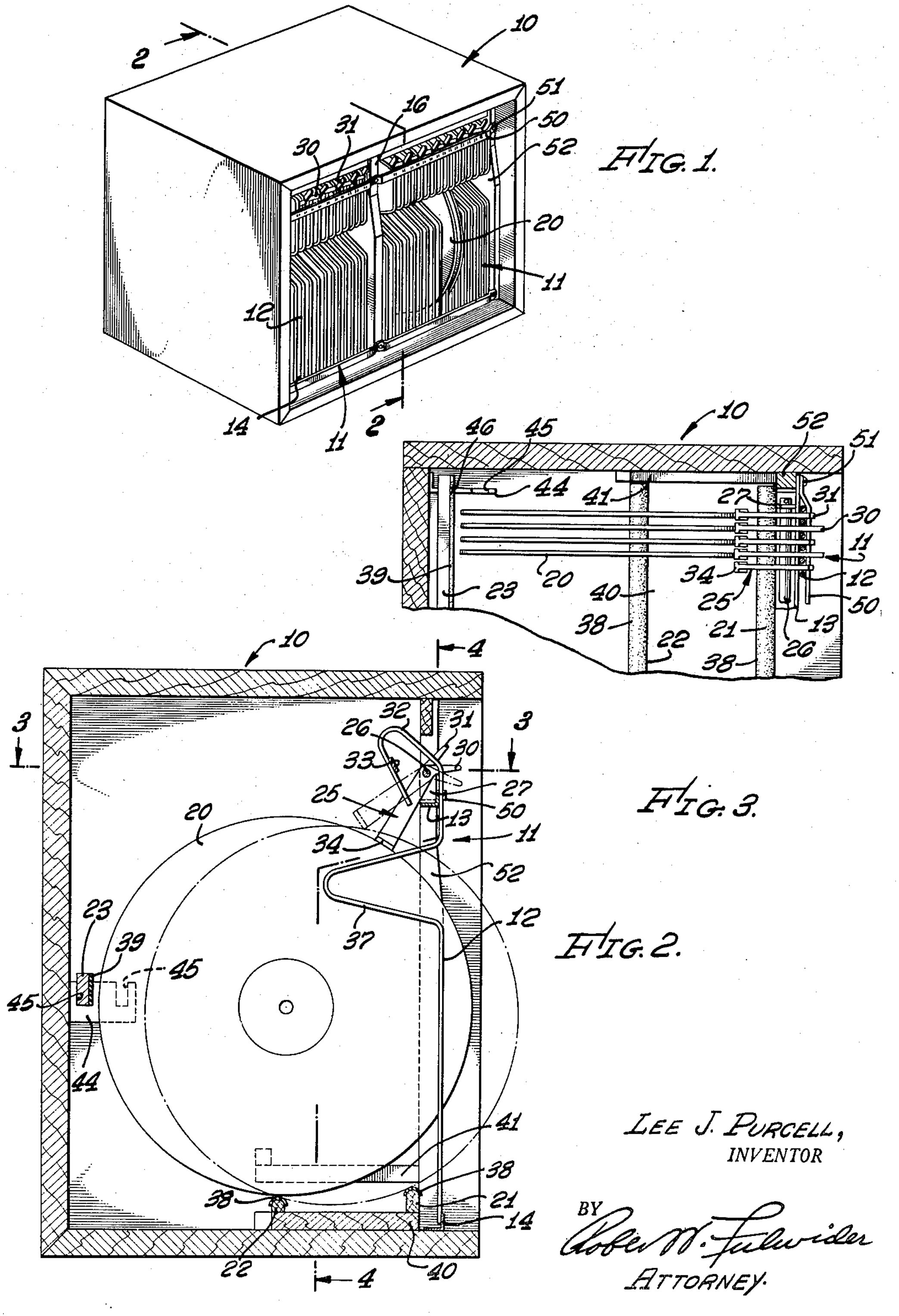
Figure 1 is a perspective view of a record cabinet embodying the invention.
Figure 2 is an elevational section taken on the line 2—2 in Figure 1.
Figure 3 is a plan section taken on the line 3—3 in Figure 2.

Referring to Figure 1, it will be seen that the cabinet embodying my invention and identified by the reference character 10, is rectangular in shape and provided with two banks of record receiving slots formed as grill-like assemblies 11. Each of the grill assemblies 11 is formed by a number of vertical bars 12 secured by spot welding or other suitable means to a pair of upper and lower angles 13 and 14 respectively, each of the angles 13 and 14 being provided with screw holes 15 at the ends thereof whereby to secure the entire grill assembly 11 into the cabinet 10. A vertical central partition 16 is provided in the cabinet 10, thus dividing the same into two compartments each having a grill 11 at the front thereof. The front of the cabinet is preferably provided with hinged doors of conventional design (not shown in the drawings).

As will be hereafter described, it is a purpose of the present invention to provide a record cabinet which is adjustable for several sizes of records; for example, ten and twelve inch records, which sizes are conventionally used on disc phonographs. Thus in the present embodiment, two compartments are provided in the cabinet 10 so that one may be adjusted to receive ten inch records while the other is adapted to hold twelve inch records. It will be realized that the grill assembly 11 could be mounted in cabinets having but a single compartment whereby to receive but a single size of records for a given adjustment of the supporting mechanism to be described.

Referring to Figure 2 it will be seen that the records are placed in the cabinet by rolling them into the space between two adjacent bars 12. As a record 20 is placed in the slot between two adjacent bars 12, it rests on a front cross rail 21 mounted across the bottom of the cabinet. As the record 20 is pushed further into the slot, its center of gravity passes beyond the vertical plane of the cross rail 21 at which point the record overbalances and tends to roll backwardly into the cabinet. As the record rolls inwardly in this manner, it contacts a rear cross rail 22 which, as will be seen in Figure 2, is somewhat lower than the cross rail 21. The momentum of the moving record 20 carries it backwardly into the cabinet until it strikes a bumper rail 23 transversely disposed across the back of the cabinet approximately midway between the top and bottom thereof.

As can be seen by the full line outline of the record 20 in Figure 2, the edge thereof is spaced from the forward cross rail 21 by the time the record contacts the bumper rail 23. If unrestrained, the record would roll back out of the cabinet until it reached a position indicated by phantom line in Figure 2 where it would rest on both the cross rails 21 and 22 and would project somewhat from the front of the cabinet.

Figures 4, 5, 6:
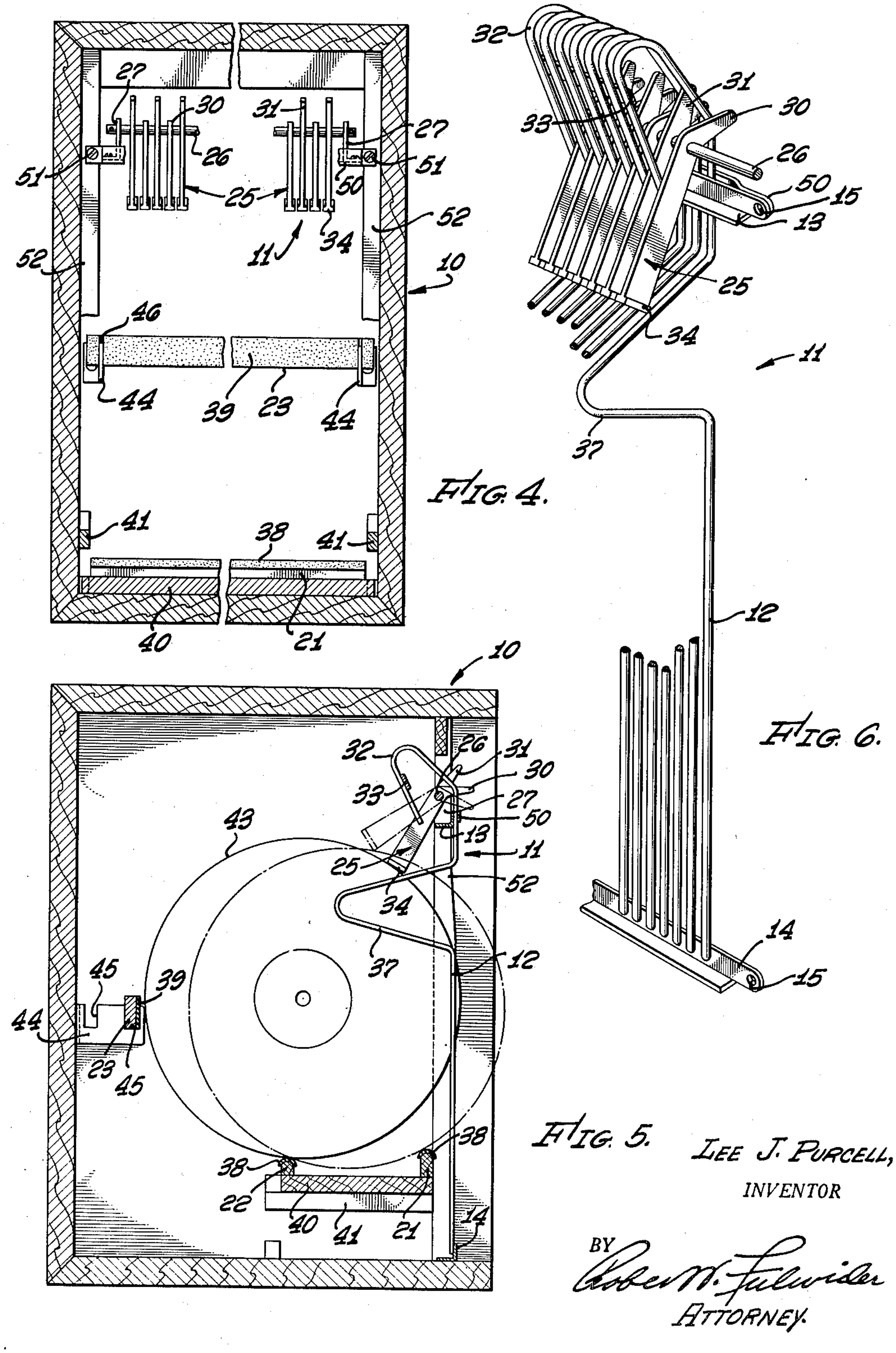
Figure 4 is an elevational fragmentary view taken on the line 4—4 in Figure 2.
Figure 5 is an elevational section similar to Figure 2 but with portions of the cabinet therein readjusted to support the smaller of two sizes of records; and, Figure 6 is a fragmentary perspective view of record-receiving and holding members employed in the device illustrated in Figure 1, the parts being shown as viewed from the rear after removal from the cabinet.

To prevent such forward return motion of the record 20, however, a pivoted cam-like member 25 is positioned between each of the rods 12 adjacent to the upper ends thereof and extends obliquely downward to contact the edge of the record as it rolls into the slot between two adjacent rods 12. As can be seen best in Figure 6, all of the cam members 25 are pivotally mounted on a cross rod 26 which in turn is supported on a pair of upstanding brackets 27 secured to the angle 13 as best seen in Figure 4. The cam members 25 have a loose fit on the rod 26 whereby they tend to hang downwardly from the latter, being supported in an angular position by contact with the rearward edge of the angle 13 as best seen in Figure 2. As the record is rolled into place, contact of the upper edge thereof with its respective cam member 25 causes the latter to rock upwardly as shown in phantom line in Figure 2, thus presenting relatively small resistance to the inward motion of the record. As the record tends to move forwardly, however, after contacting the bumper rail 23, the frictional engagement of the cam member 25 causes a jamming or ratchet-like action, which prevents forward motion of the record.

When it is desired to release any one of the records, downward pressure is applied to a trigger-like projection 30 or 31 formed in each of the cam members 25. Such downward pressure on a trigger member 30 or 31 swings the cam member 25 clockwise (Figures 2 or 5) releasing the record and allowing it to roll forward to the position shown in phantom line in Figures 2 and 5. As can be seen best in Figure 6, the trigger-like projections 30 are angularly disposed to the trigger member 25, whereas the trigger members 31 are substantially elongations of the member 25. The cam members 25 having triggers 30 and 31 are placed alternately on the rod 26 whereby to separate the trigger 30 or 31 of adjacent cam members to facilitate digital operation thereof.

Since the cam members 25 have a relatively loose fit on the shaft 26 they would tend to become laterally displaced if not otherwise guided. To this end the rods 12 are formed at their upper ends with a backwardly extending loop 32 and all adjacent rods are interconnected by a cross bar 33 spot welded thereto or otherwise suitably secured. Thus it will be seen that the lower end of the loop 32 of each of the rods 12 is positioned between adjacent cam members 25 whereby to hold the same in alignment with the slots formed between two adjacent bars 12. To further assure that the cam member 25 will always contact the upper edge of the record placed in a given slot, the lower end of each cam member 25 is formed with a laterally projecting foot portion 34 as best seen in Figure 6.

In order to guide the record 20 in its rearward rolling motion, and to hold the various records in parallel relationship, each of the bars 12 is formed with a V-shaped, backwardly extending bend 37 which prevents the records from twisting in the cabinet as they enter into or exit therefrom, and furthermore, holds the records in spaced parallel relationship.

To protect the records against chipping and abrasion the upper edges of the rails 21 and 22 are covered by strips 38 of felt, sponge rubber, or other protective material. For a similar reason a strip 39 is secured to the bumper rail 23.

Further protection against abrasion may be afforded by flocking the vertical bars 12 to produce a felt-like non-abrasive surface.

In operation of the cabinet as thus far described, a record 20 is placed in a slot between adjacent vertical rods 12 and pushed back until it rolls of its own weight backwardly into the cabinet, pushing the cam member 25 upwardly and to the rear as shown in Figure 2. Upon reaching the bumper rail 23, the record rebounds slightly and is gripped by the cam member 25 and held in the position shown in full lines in Figure 2.

As previously stated, it is desirable that the supporting elements in the record cabinet be adjustable to receive records of any one of several sizes. To this end the cross rails 21 and 22 are mounted on a transverse shelf-like member 40 which may be supported on the bottom of the cabinet 10 as shown in Figure 2 or alternately, may be raised and supported as shown in Figure 5 on cleats 41 secured to the sides of the cabinet and to the partition 16. Such upward adjustment of the cross rails 21 and 22 brings the upper edge of a small record 43 into proper relationship with the cam member 25 as shown in Figure 5. To accommodate the smaller diameter of the record 43 it is also necessary to move the bumper rail 23 forwardly as shown in Figure 5. For this purpose the bumper rail is secured in a pair of forwardly projecting brackets 44 which are each provided with two notches 45 whereby to receive the ends of the bumper rail 23 and support the same across the back of the cabinet either in the forward position shown in Figure 5 or the rearward position shown in Figure 2. To hold the rail 23 securely in place, it is formed with grooves 46 in the ends thereof to engage the bracket 44.

For the purpose of identifying the records so that any one of a group placed in the cabinet may be withdrawn at will, a designation strip 50 is secured across the front of the vertical rods 12 adjacent the upper ends thereof and is spot welded or otherwise suitably secured to the angle 13. Suitable indicia such as numbers or letters are placed on the designation strip adjacent each of the record-receiving slots.

The grill members 11 are secured in the cabinet 10 by wood screws 51 which enter vertical cleats 52 secured to the inside ends of the cabinet 10, the inner ends of the angles 13 and 14 being secured to the partition 16 as shown in Figure 1. When it is desired to readjust a particular record compartment to receive larger or smaller records, the grill assembly 11 is removed by taking out the wood screws 51 and the shelf 40 is raised or lowered as desired, a corresponding adjustment being made of the bumper rail 23. The grill assembly 11 is then replaced and the compartment is ready for use.

Thus it will be seen that I have provided a record cabinet which is relatively simple to manufacture, is comprised of parts well suited to mass production, and is easily operated and readily adjustable.

While the record cabinet embodying the invention is fully capable of achieving the objects and providing the advantages hereinbefore stated, it is realized that those skilled in the art may considerably modify the device without departing from the spirit of the invention. For this reason I do not mean to be limited to the forms shown and described, but rather to the scope of the appended claims.

I claim:

1. In a record cabinet of the class described: means forming a vertical slot shaped receptacle adapted to guide a record disc in rolling motion from an insertion position to a storage position in said cabinet; releasable cam means mounted in said receptacle and positioned to contact an edge of said disc, said cam means being freely pivotable to permit said rolling motion of said disc in an inward direction and adapted to jam against said disc and prevent said motion in an outward direction; transverse supporting means mounted in said cabinet adjacent the bottom thereof and adapted to support said disc resting on edge thereon, said supporting means being adapted and disposed to establish a lowermost position of rest for said disc intermediate said insertion and storage positions and in which said disc protrudes from said cabinet whereby to facilitate withdrawal thereof; and transverse bumper means in said cabinet adjacent the rear thereof positioned and adapted to stop said inwardly rolling disc with the same in said storage position whereby said disc when inserted in said cabinet rolls by its own momentum past said intermediate position against said bumper means and is held by said cam means in said storage position.

2. In a record cabinet of the class described: means forming a vertical slot shaped receptacle adapted to guide a record disc in rolling motion; movable cam means mounted in said receptacle and positioned to contact an edge of said record, said cam means being further adapted to permit said rolling motion in an inward direction and prevent said motion in an outward direction; and a pair of cross rails mounted in said cabinet adjacent the bottom thereof and adapted to support said record disc resting on edge thereon, said rails being disposed to establish on intermediate position of rest for said disc in which the latter protrudes from said cabinet whereby to facilitate withdrawal thereof, said rails being removably secured to said cabinet for vertical adjustment within said cabinet whereby to support record discs of various diameters in operative position relative to said cam means.

3. In a record cabinet of the class described: means forming a vertical slot shaped receptacle adapted to guide a record disc in rolling motion; movable cam means mounted in said receptacle and positioned to contact an edge of said record, said cam means being further adapted to permit said rolling motion in an inward direction and prevent said motion in an outward direction; a pair of cross rails mounted in said cabinet adjacent the bottom thereof and adapted to support said record disc resting on edge thereon, said rails being disposed to establish an intermediate position of rest for said disc in which the latter protrudes from said cabinet whereby to facilitate withdrawal thereof and said rails being removably secured in said cabinet for vertical adjustment within said cabinet whereby to support record discs of various diameters in operative position relatively to said cam means; and transverse bumper means in said cabinet adjacent the rear thereof positioned and adapted to stop said inward rolling motion with said disc in a storage position entirely within said cabinet, said bumper means being removably secured in said cabinet for horizontal movement inwardly and outwardly from the rear of said cabinet whereby to adapt the same to receive records of various sizes.

4. In a record cabinet of the class described: a pair of spaced vertical bars adapted to receive a record disc therebetween and guide the same in rolling motion into said cabinet; a gravity biased cam member pivotally mounted for free swinging movement between said bars adjacent the upper end thereof, said cam member being adapted and positioned to contact an upper edge of said disc as it rolls into said cabinet and to jam against said edge at a point substantially forward of the highest point thereon to prevent withdrawal of said record from a storage position entirely within said cabinet; transverse supporting means mounted on said cabinet adjacent the bottom thereof and adapted to support said disc resting on edge thereon, said supporting means being adapted and disposed to establish an intermediate position of rest for said disc in which the latter protrudes from said cabinet whereby to facilitate withdrawal thereof; and a transverse bumper member mounted in said cabinet adjacent the rear thereof, said bumper being positioned and adapted to stop inward rolling motion of said disc with the latter in a storage position entirely within said cabinet, said disc being held in such storage position by said cam means.

5. In a record cabinet of the class described: a pair of spaced apart vertical bars mounted in the front of said cabinet and adapted to receive a record disc therebetween for insertion into said cabinet, said bars having inwardly extending bent portions therein whereby to guide said disc in rolling motion into said cabinet, a gravity biased cam member pivotally mounted for free swinging movement between said bars adjacent the upper end thereof, said cam member being adapted to contact an upper edge of said disc as it rolls into said cabinet and to jam against said edge at a point substantially forward of the highest point thereon to prevent withdrawal of said record from a storage position entirely within said cabinet; and a pair of cross rails mounted in said cabinet adjacent the bottom thereof and adapted to support said record disc resting on edge thereon, said guide rails being disposed to establish an intermediate position of rest for said disc in which the latter protrudes from said cabinet whereby to facilitate the withdrawal thereof.

6. In a record cabinet of the class described: a pair of spaced apart vertical bars mounted in said cabinet and adapted to receive a record disc therebetween for insertion into said cabinet, said bars having inwardly extending bent portions therein whereby to guide said disc in rolling motion into said cabinet; transverse supporting means mounted in said cabinet adjacent the bottom thereof and adapted to support said disc resting on edge thereon, said supporting means being adapted and disposed to establish an intermediate position of rest in said disc in which the latter protrudes from said cabinet whereby to facilitate withdrawal thereof; and a gravity biased cam member pivotally mounted for free swinging motion between said bars adjacent the upper end thereof, said cam member being adapted to contact an upper edge of said disc as it rolls into said cabinet and to jam against said edge at a point substantially forward of the highest point thereon to permit withdrawal of said record from a storage position entirely within said cabinet, said cam member having an outwardly projecting finger portion to permit operation thereof to disengage the same from said disc whereby to permit the latter to roll into said intermediate position.

7. In a record cabinet of the class described: means forming a box-like compartment having an open front; a grill mounted in said open front and comprised of a plurality of vertical bars secured in spaced parallel relationship to transverse mounting members, each adjacent pair of said bars being adapted to receive a record disc therebetween for insertion into said compartment, said bars having inwardly extending bent portions therein whereby to guide a record disc in rolling motion into said compartment; a pair of transverse rails mounted adjacent the bottom of said compartment and adapted to support said disc resting on edge thereon, said rails being so disposed as to establish an intermediate position of rest for said disc in which the latter protrudes from said cabinet whereby to facilitate withdrawal thereof; a transverse bumper member secured to the rear wall of said compartment and positioned and adapted to stop said inward rolling motion with said disc in a storage position entirely within said cabinet; a plurality of cam members each pivotally mounted for free swinging movement between an adjacent pair of said bars near the upper ends thereof, said cam members extending obliquely downward into said cabinet whereby each is adapted to contact an upper edge of said disc as the same is rolled into said cabinet, the angular disposition of said cam member being such as to permit rearward motion of said disc to said storage position and to effect a jamming action of said cam member against said disc at a point substantially forward and below the highest point thereon to hold the latter in said storage position, each of said cam members having an outwardly extending finger portion whereby said cam members may be selectively rocked back to disengage the same from said disc whereby to permit the latter to roll forwardly into said intermediate position.

8. The construction recited in claim 7 further characterized by having said rails and said bumper member removably secured to said cabinet walls for forward and rearward adjustment of said bumper member and vertical adjustment of said rails whereby to adapt said compartment to receive records of relatively smaller diameter in operative position with respect to said cam members.

9. In a record storage structure of the class described: a plurality of vertical separators spaced apart to form a plurality of slot-shaped receptacles each adapted to guide a record disc rolling from an insertion position to a storage position in said receptacle; a releasable cam mounted in each receptacle and positioned to contact an edge of said disc rolling in said receptacle, said cam being freely pivotable to permit inward rolling of said disc and adapted to jam against said disc and prevent outward rolling thereof; transverse members in said structure adapted to support a disc in any of said receptacles resting on edge on said transverse members, said members being disposed to establish a lowermost position of rest for a disc resting thereon, said position of rest being between said insertion and storage positions, and one in which said disc protrudes from said structure to facilitate withdrawal thereof; and transverse means in said structure forming a bumper for a record in any of said receptacles adjacent the rear thereof to stop said inward rolling of said disc with the same in said storage position whereby a disc when inserted into one of said receptacles rolls by its own momentum past said intermediate position against said bumper means and is held by said cam in said storage position.

10. The construction of claim 1 further characterized in that said transverse members are removably secured in said structure and vertically adjustable to support discs of various diameters in operative position relative to said cams.

11. The construction of claim 10 further characterized in that said bumper means is removably secured in said structure and horizontally adjustable to adapt said receptacles to receive discs of various diameters.

12. In a record storage structure of the class described: a pair of spaced vertical bars adapted to receive a record disc therebetween and guide the same in rolling motion into the space between said bars; a gravity-biased cam pivotally mounted for free swinging movement between said bars adjacent the upper end thereof, said cam being adapted and positioned to contact the upper edge of said disc as it rolls into said space and to jam against said edge at a point substantially forward of the highest point thereon to prevent withdrawal of said record from a storage position entirely within said space; transverse supporting means mounted in said structure adjacent the bottom thereof and extending across said space to support said disc resting on edge in said space, said supporting means being adapted and disposed to establish an intermediate position of rest for said record in which the latter protrudes from said space whereby to facilitate withdrawal thereof; and a transverse bumper member mounted in said structure adjacent the rear thereof, said bumper extending across said space to stop inward rolling motion of a record in said space with said record in a storage position entirely within said cabinet, said record being held in such storage position by said cam.

13. In a record storage structure of the class described: a pair of spaced apart upright bars mounted in the front of said structure and adapted to receive a record disc therebetween for insertion into the space between said bars, said bars having inwardly extending portions to guide said disc in rolling motion into said space; a gravity-biased cam pivotally mounted for free swinging movement between said bars adjacent the upper end thereof, said cam being adapted to contact an upper edge of said record as it rolls into said cabinet and to jam against said edge at a point substantially forward of the highest point thereon to prevent withdrawal of said record from a storage position at a rearmost limit within said space; and a pair of cross members mounted in said space adjacent the bottom thereof adapted to support said record resting on edge therein, said members being disposed to establish an intermediate position of rest for said record in which the latter is forward of said storage position and protrudes from said space in order to facilitate the withdrawal thereof.

14. The construction of claim 13 further characterized by having a bumper extending across said space adjacent the rear thereof to halt said record in said storage position, said record being retained therein by said cam.

LEE J. PURCELL.

REFERENCES CITED

The following references are of record in the file of this patent:

UNITED STATES PATENTS

| Number | Name | Date |
|---|---|---|
| 1,082,361 | Robinson | Dec. 23, 1913 |
| 1,449,922 | Tresnak | Mar. 27, 1923 |
| 1,543,738 | Underwood | June 30, 1925 |
| 2,352,710 | Hart | July 4, 1944 |
| 2,402,044 | Heckman | June 11, 1946 |
| 2,402,076 | Painter | June 11, 1946 |